United States Patent
Anderson (10) Patent No.: US 7,889,074 B2
(45) Date of Patent: Feb. 15, 2011

(54) COMPUTER MODULE FOR SENSOR SYSTEM WITH ACTIVATION ALERT

(75) Inventor: John R. Anderson, White Lake, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 788 days.

(21) Appl. No.: 11/636,034

(22) Filed: Dec. 8, 2006

(65) Prior Publication Data

US 2007/0132554 A1    Jun. 14, 2007

Related U.S. Application Data

(63) Continuation-in-part of application No. 11/581,299, filed on Oct. 16, 2006, now abandoned.

(60) Provisional application No. 60/748,477, filed on Dec. 8, 2005.

(51) Int. Cl.
   *G08B 21/001* (2006.01)
(52) U.S. Cl. .......... 340/540; 340/539.1; 340/686.1; 340/426.1; 340/531
(58) Field of Classification Search ............ 340/531, 340/539.1, 5.1, 5.2, 5.7, 5.72, 426.1, 427, 340/5.54, 5.51, 517, 521, 438, 309.16, 540, 340/539.14, 686.1
See application file for complete search history.

(56) References Cited

U.S. PATENT DOCUMENTS

| | | | | | |
|---|---|---|---|---|---|
| 4,587,522 | A | * | 5/1986 | Warren | 340/902 |
| 5,337,082 | A | * | 8/1994 | Fredericks | 342/69 |
| 5,552,789 | A | * | 9/1996 | Schuermann | 340/5.21 |
| 6,028,505 | A | * | 2/2000 | Drori | 340/426.17 |
| 6,052,054 | A | * | 4/2000 | Hampson et al. | 340/568.6 |
| 6,166,627 | A | * | 12/2000 | Reeley | 340/426.25 |
| 6,411,204 | B1 | * | 6/2002 | Bloomfield et al. | 340/467 |
| 6,630,891 | B1 | * | 10/2003 | Dilling | 340/902 |
| 6,693,517 | B2 | * | 2/2004 | McCarthy et al. | 340/425.5 |
| 6,937,136 | B2 | * | 8/2005 | Greenwood et al. | 340/5.61 |
| 7,292,137 | B2 | * | 11/2007 | Gilbert et al. | 340/426.3 |
| 7,365,633 | B2 | * | 4/2008 | Inoue et al. | 340/5.61 |
| 7,498,927 | B1 | * | 3/2009 | Kaji et al. | 340/426.1 |
| 2003/0222757 | A1 | * | 12/2003 | Ghabra et al. | 340/5.72 |
| 2005/0242923 | A1 | * | 11/2005 | Pearson et al. | 340/5.62 |

\* cited by examiner

*Primary Examiner*—Daniel Previl (57) ABSTRACT

A method of preparing a computer module for the receipt of an activation alert communicated from a sensor system includes programming the computer module to recognize the activation alert and communicating the activation alert to the computer module. The computer module initializes a start-up and initialization sequence in response to receiving the activation alert.

18 Claims, 7 Drawing Sheets

COMPUTER MODULE FOR SENSOR SYSTEM WITH ACTIVATION ALERT

CROSS-REFERENCE TO RELATED APPLICATIONS

This application is a continuation-in-part of co-pending U.S patent application Ser. No. 11/581,299, filed Oct. 16, 2006, and also claims priority to U.S. Provisional Application No. 60/748,477, filed Dec. 8, 2005.

BACKGROUND OF THE INVENTION

This invention generally relates to sensor systems, and more particularly to a computer module that communicates with a smart sensor system having activation alert capabilities.

Many electronic products, especially in the automotive and medical fields, require a rapid response to a sensed input signal. Input devices, such as smart sensors, are known which are used to evaluate the validity of an input signal prior to communicating an output signal for actuating an electronic system. Mechanical switches and relays which generate the input signals are electrically noisy when they change from open to closed or closed to open. The transition from a low input signal (i.e., an "off" position of the mechanical switch or relay) to a high input signal (i.e., an "on" position of the mechanical switch or relay) creates a signal bounce for a certain period of time. During this period of time, such as a time period of 60 milliseconds, the input device is uncertain whether the input signal is a true signal for which an output signal must be communicated to actuate the appropriate electronic system. Therefore, the input signal must be analyzed and filtered to determine whether a true signal change has occurred.

Smart sensors often include special circuitry or microprocessors to evaluate the validity of an input signal prior to communicating the output signal to the electronic system. The smart sensor utilizes the microprocessor or special circuitry to filter and evaluate the input signal while the input signal is bouncing. Once the smart sensor determines that the input signal is valid, the smart sensor communicates an output signal to a computer module of an electronic system.

Computer modules which control electronic systems often utilize sleep modes for preserving system power during periods of time in which the electronic systems are not in use. For example, a vehicle passive entry and starting (PASE) system may be programmed to enter a sleep mode when the vehicle is turned off. Therefore, the output signal communicated from the smart sensor will wake up the computer module of the electronic system. The computer module must then execute a startup and initialization sequence in which the circuitry of the computer module prepares to receive a valid output signal from the smart sensor and perform the functionality of the electronic system.

Disadvantageously, the amount of time required to startup and initialize the computer module is added to the amount of time required to debounce the input signal. That is, the reaction of the receiver module may be postponed until the start-up and initialization sequence is completed. Therefore, the electronic system reaction time is increased, which may result in an additional 50 milliseconds or more of reaction time. This additional reaction time may be unacceptable to a customer.

Accordingly, it is desirable to provide a computer module which can communicate with a sensor system having activation alert capabilities.

SUMMARY OF THE INVENTION

An example method of preparing a computer module for the receipt of an activation alert communicated from a sensor system includes programming the computer module to recognize the activation alert and communicating the activation alert to the computer module. The computer module initializes a start-up and initialization sequence in response to receiving the activation alert.

An example computer module includes a microprocessor and input circuitry in communication with the microprocessor. The microprocessor is operable to receive an activation alert through the input circuitry and initialize a start-up and initialization sequence in response to receiving the activation alert.

An example Passive Entry and Starting (PASE) system for a vehicle includes a keypad sensor having a microprocessor and a computer module in communication with the microprocessor of the keypad sensor. The microprocessor of the keypad sensor is operable to analyze an input signal received in response to a manipulation of at least one actuable button of the keypad sensor. The computer module is operable to recognize the activation alert and initialize a start-up and initialization sequence in response to recognition of the activation alert.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
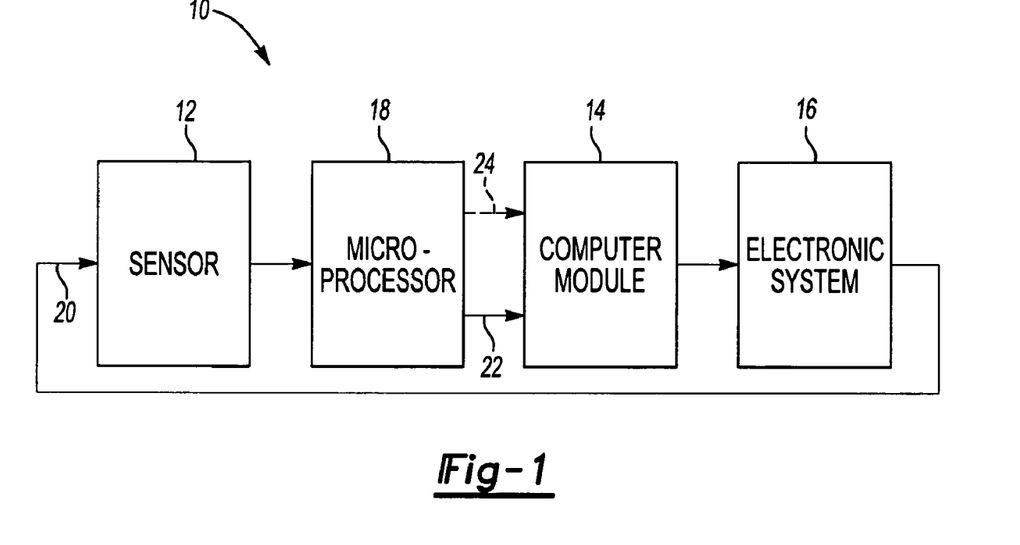
FIG. 1 illustrates an example sensor system according to the present invention.

Referring to FIG. 1, a sensor system 10 includes a sensor 12 and a computer module 14. The sensor system 10 communicates with an electronic system 16. The electronic system 16 may include any known electronic system including but not limited to automatic faucet systems, medical devices, security systems, electronic vehicle systems and central heating and cooling systems. A person of ordinary skill in the art with the benefit of the teachings disclosed herein will be able to provide a sensor system for communicating with known electronic systems.

The sensor 12 communicates with a microprocessor 18 for analyzing an input signal 20. In one example, the input signal 20 comprises an electrical signal generated by the actuation of a switch from an "off" position to an "on" position. For example, the input signal 20 may be generated by the actuation of a power switch of a medical device. In one example, the input signal 20 comprises radio frequency (RF) signals. In another example, the input signal 20 includes electrical capacitive signals. It should be understood that the input signal may comprise any communication medium known in the art.

As is known, the microprocessor 18 is programmable to execute a set of instructions. The microprocessor 18 of the sensor 12 evaluates the input signal 20 to determine whether the input signal 20 represents a valid input signal. That is, where the sensor system 10 is connected to a switch, the microprocessor 18 evaluates the input signal 20 received by the sensor 12 to determine whether the switch has been actuated from an "off" position to an "on" position. Due to electrical noise associated with the input signal 20, the input signal 20 is unstable when received by the sensor 12.

Therefore, the microprocessor 18 evaluates the input signal 20 over an evaluation period P (See FIG. 2) to determine the validity of the input signal 20. In one example, the evaluation period P is approximately 60 milliseconds. A person of ordinary skill in the art would understand that the actual evaluation period P will vary depending upon the type of electronic system 16 that the sensor system 10 is associated with. The microprocessor 18 undergoes a debouncing time T (FIG. 2) associated with the evaluation period P which represents a period of time for which the sensor system 10 waits for the input signal 20 to stabilize and ensure that a true input signal 20 has been received by the sensor 12. In another example, special circuitry included on the sensor 12 is used to evaluate the validity of the input signal 20.

Figure 2:
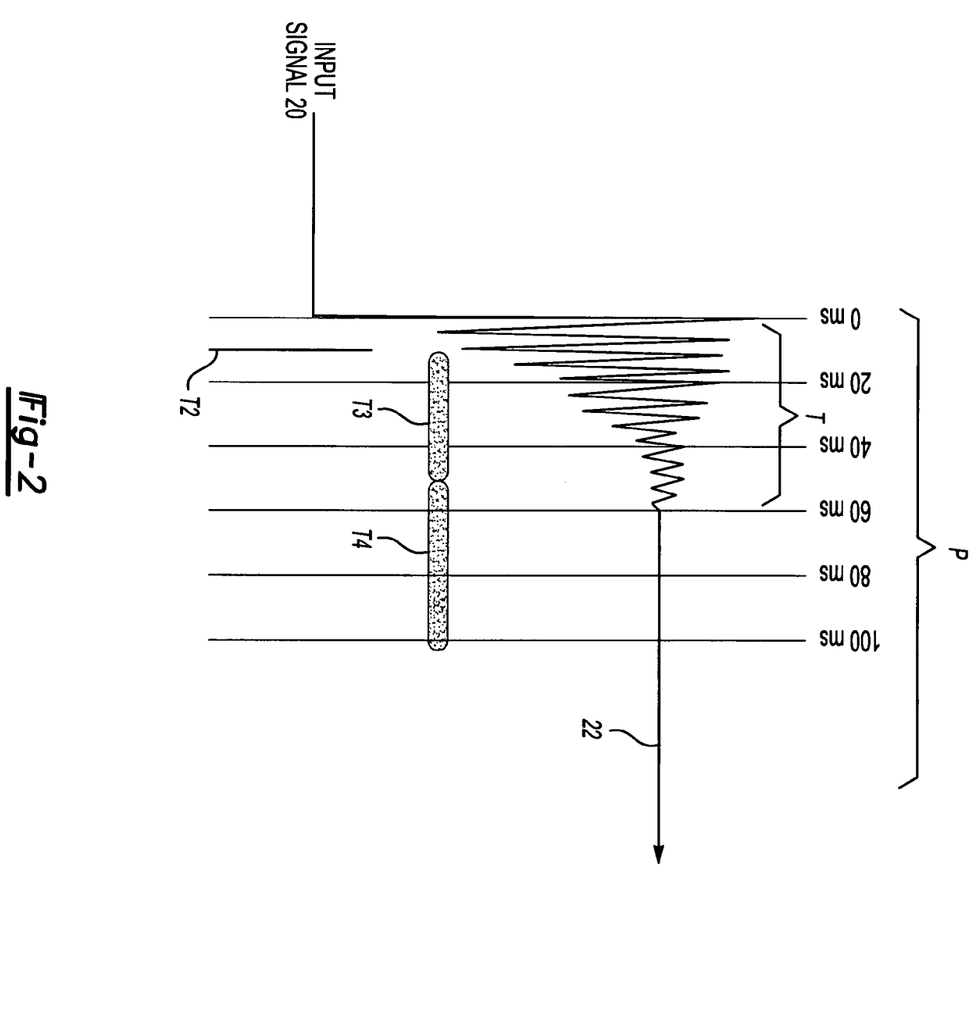
FIG. 2 illustrates a timing diagram for an evaluation period of the example sensor system.

The sensor 12 is also operable to communicate an activation alert 24 to the computer module 14 during the debouncing time T at time T2 (See FIG. 2). In one example, the activation alert 24 is communicated to the computer module 14 via a BUS message. A BUS message is a packet of information (i.e., messages) communicated via a communication bus to share information between the various computer modules utilized by the electronic system 16.

In another example, discrete wiring is connected between the microprocessor 18 and the computer module 14 to communicate the activation alert 24. Discrete wiring is used to communicate information to the computer module 14 via a dedicated electrical signal through a wire which is dedicated to that specific task. It should be understood that the activation alert 24 may be communicated from the microprocessor 18 to the computer module 14 in any known manner.

The activation alert 24 is communicated to the computer module 14 in response to a predefined prompt. In one example, the predefined prompt comprises a confidence level percentage. For example, the microprocessor 18 of the sensor 12 may have an 80% confidence level percentage 20% into the validation cycle. That is, the microprocessor 18 may be 80% confident that the input signal 20 is a valid input signal after approximately 12 milliseconds of the 60 millisecond debouncing time T. A person of ordinary skill in the art with the benefits of the teachings disclosed herein would be able to program the microprocessor 18 to communicate the activation alert 24 in response to any known predefined prompt including but not limited to a lapse of time, a confidence level percentage or any other definable criterion. It should be understood that the amount of time or the level of confidence required to trigger the predefined prompt will vary depending upon the type of electronic system 16 that is being monitored by the sensor system 10.

Once the activation alert 24 is communicated to the computer module 14 signifying that there may be a signal change (i.e., actuation of a switch from an off position to an on position), the computer module 14 begins a startup and initialization sequence for preparing for the receipt of a valid output signal 22. Power is provided to all circuits of the computer module 14 during the startup and initialization sequence.

The computer module 14 receives the activation alert 24 during the debouncing time T rather than after the input signal 20 is debounced. The startup and initialization sequence of the computer module 14 is performed partially in parallel with the evaluation period P of the input signal 20, thereby initializing a reaction time T3 (See FIG. 2) of the computer module 14 earlier in time than if no activation alert 24 were communicated (as illustrated by reaction time T4 in FIG. 2). As illustrated in FIG. 2, the reaction time of a computer module 14 that receives an activation alert begins after approximately 12 ms rather than after approximately 45 seconds where no activation alert is received. Therefore, once the computer module 14 receives the validated output signal 22, the computer module 14 is prepared to communicate with the electronic system 16 to perform the functionality associated with that electronic system 16. For example, where the electronic system 16 is a passive entry and starting (PASE) system for a vehicle, the computer module 14 may command that the vehicle doors be unlocked.

Figure 3:
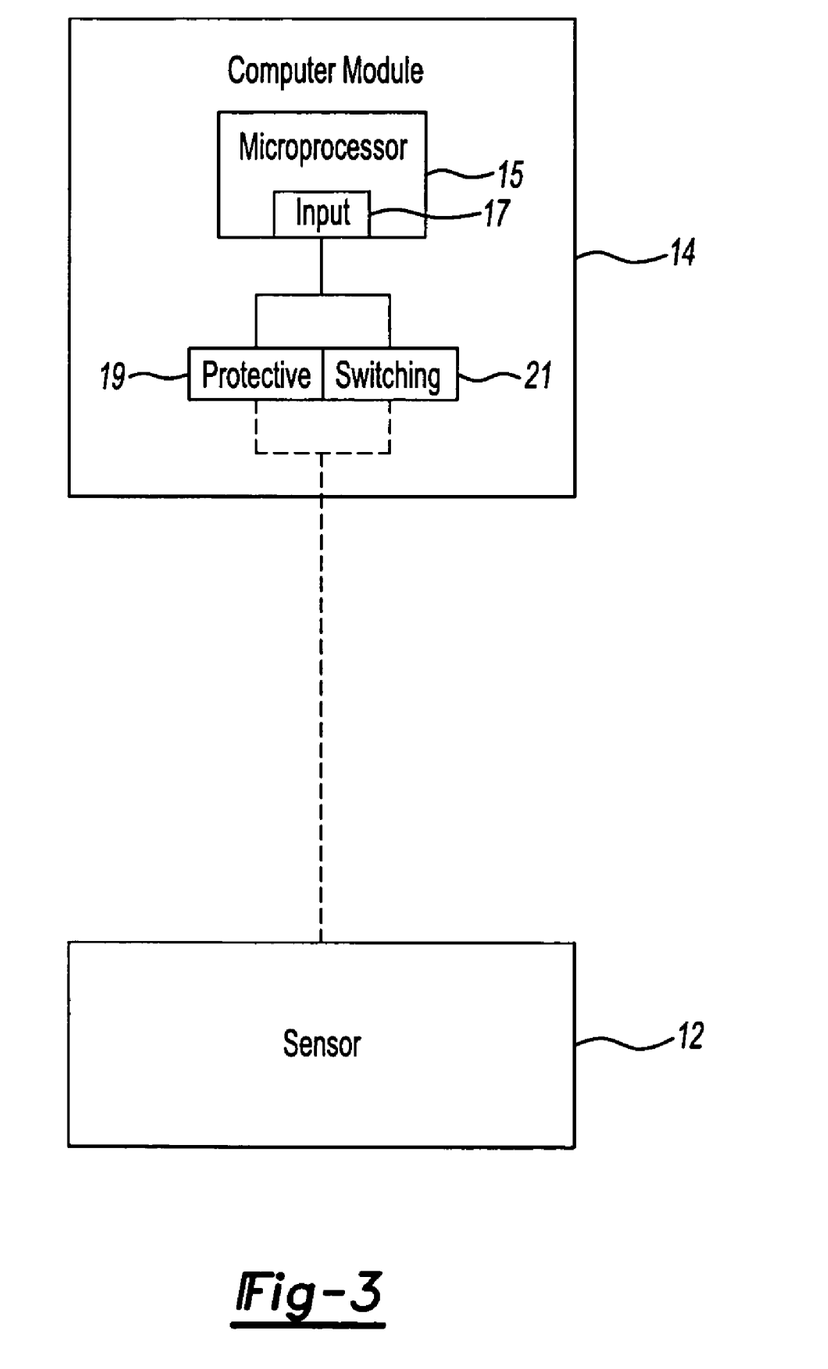
FIG. 3 illustrates an example computer module for receiving an activation alert from the example sensor system illustrated in FIG. 1.

FIG. 3 illustrates an example computer module 14 which communicates with the sensor 12 to receive the activation alert 24. The computer module 14 includes a microprocessor 15 and input circuitry 17. The microprocessor is programmed to recognize the activation alert 24 communicated from the sensor 12. A person of ordinary skill in the art having the benefit of this disclosure would understand how to program the microprocessor 15 to receive the activation alert 24 through the input circuitry 17. The input circuitry 17 represents a circuit or circuits within the computer module 14 which is/are dedicated to receiving the activation alert 24. That is, the input circuitry 17 is an input on the microprocessor 15.

The activation alert 24 is received through the input circuitry 17 and is recognized by reading BUS messages, in one example. In another example, the input circuitry 17 includes discrete wiring connected between the sensor 12 and the computer module 14 and the activation alert 24 is recognized by reading signals received through the discrete wiring. It should be understood that the computer module may recognize the activation alert 24 in any known manner.

The computer module 14 may also include protective circuitry 19 and switching circuitry 21 connected between the sensor 12 and the input circuitry 17. The protective circuitry 19 aids in the prevention of damage to the microprocessor 15 which may result from electrical surges communicated from the sensor system 10. The microprocessor 15 utilizes the switching circuitry 21 to communicate between different electronic systems.

Figure 4:
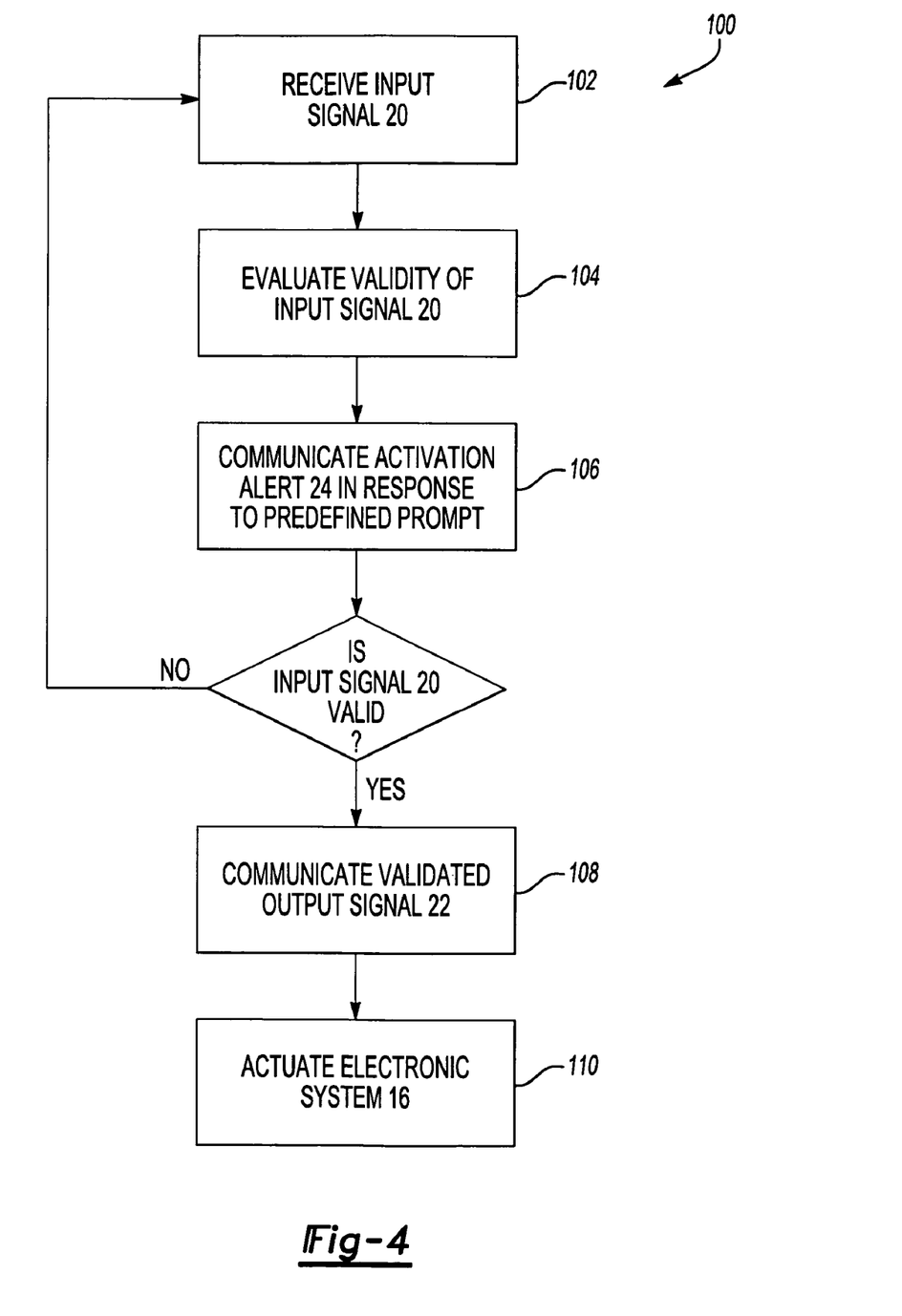
FIG. 4 is a block diagram illustrating an example method of communicating an activation alert to an electronic system with the example sensor system.

Referring to FIG. 4, and with continuing reference to FIGS. 1 and 2, a method 100 for communicating an activation alert to an electronic system with a sensor system is illustrated. At step block 102, an input signal 20 is received by the sensor 12. In one example, the sensor 12 receives the input signal 20 in response to the actuation of a switch of the electronic system 16 from an "off" position to an "on" position. In another example, the input signal 20 is received by the sensor 12 in response to the manipulation of a button, or in any other known manner. Next, at step block 104, the microprocessor 18 of the sensor 12 evaluates the validity of the input signal 20 received at step block 102. In one example, the input signal 20 is evaluated by analyzing the input signal 20 in 5 millisecond intervals during the debouncing time T. The input signal 20 is filtered to determine whether the input signal 20 represents a valid input signal.

An activation alert signal 24 is communicated to a computer module 14 in response to a predefined prompt at step block 106. The activation alert is communicated at least partially simultaneously with the evaluation of the input signal (step block 104). At this step, the computer module 14 is awakened from a sleep mode and prepared to respond to the microprocessor 18 in the event a validated output signal 22 is received by the computer module 14. That is, the computer module 14 is awakened from a sleep mode in which part or all of its circuitry is in a low power mode to preserve power, and begins a startup and initialization sequence. During the startup and initialization sequence, the computer module 14 powers up all its circuitry so it may respond to the electronic system 16 in response to the receipt of a validated output signal 22 in an efficient manner.

In one example, the predefined prompt for triggering the activation alert signal 24 comprises a confidence level percentage. The confidence level percentage represents the confidence of the microprocessor 18 that the input signal 20 represents a valid input signal. In one example, the confidence level percentage is at least 80%, although the actual confidence level percentage will vary depending upon the type of electronic system 16 the sensor system 10 is communicating with. In another example, the predefined prompt is a lapse of time.

At step block 108, subsequent to the lapse of the debouncing time T and the determination that the input signal 20 represents a valid input signal, a validated output signal 22 is communicated to the computer module 14. However, if the microprocessor 18 determines that the input signal 20 is not a valid input signal, the method returns to step block 102 where the sensor 12 awaits a new input signal 20 for evaluation.

Finally, at step block 110 the computer module 14 communicates a signal in a known manner, such as through radio frequency (RF) signals, to the electronic system 16 associated with the computer module 14 to accomplish the functionality associated with that electronic system 16. For example, where the electronic system 16 comprises a passive entry and starting (PASE) system, the computer module 14 communicates with the PASE system to unlock a vehicle door.

Figure 5:
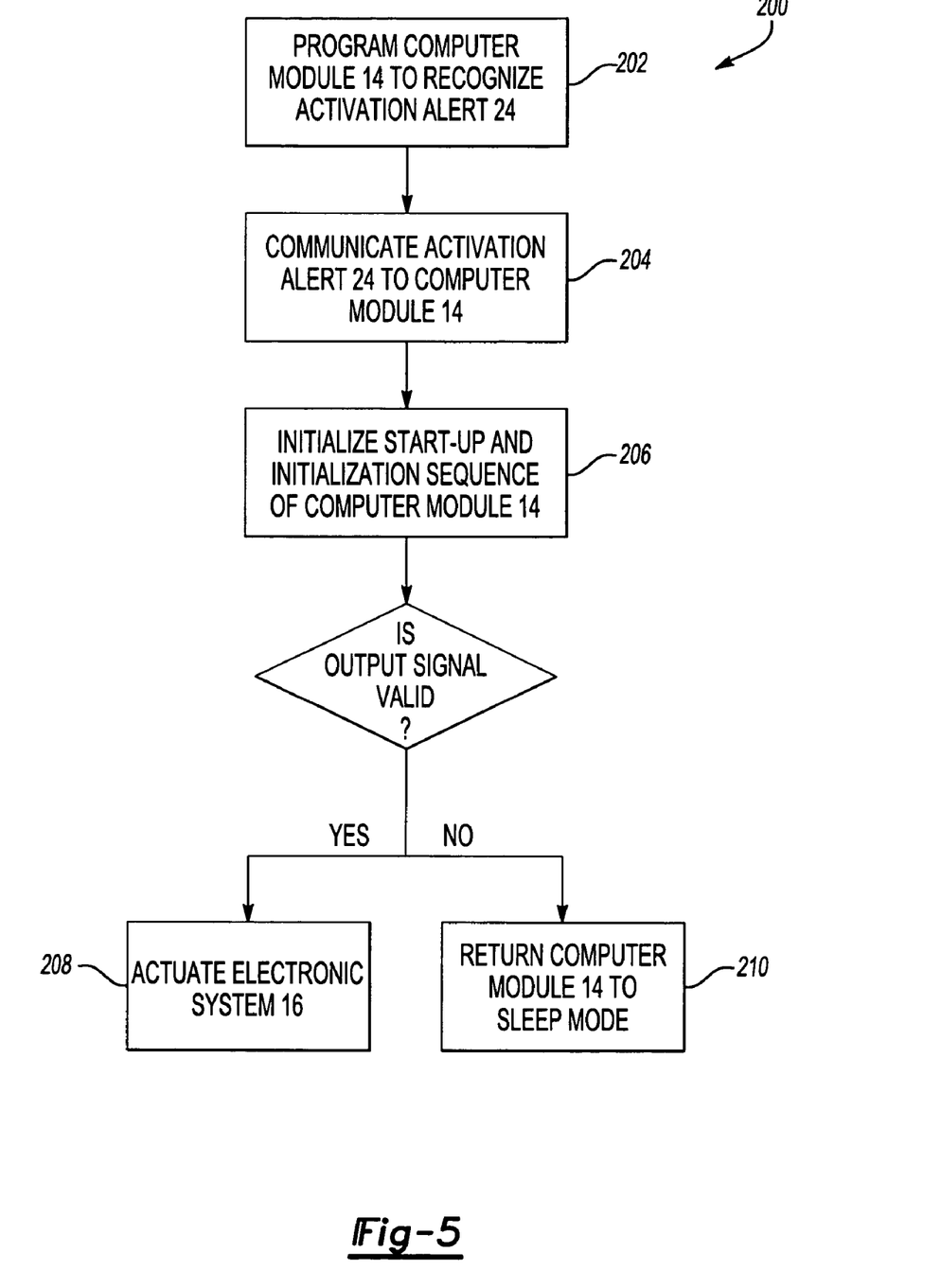
FIG. 5 is a block diagram illustrating an example method of preparing a computer module for the receipt of an activation alert communicated from the example sensor system.

FIG. 5 illustrates an example method 200 of preparing a computer module 14 for the receipt of an activation alert 24 communicated from a sensor 12. At step block 202, the computer module 14 is programmed to recognize the activation alert 24. It should be understood that the computer module 14 may recognize the activation alert 24 in any known manner. In one example, the activation alert 24 is recognized by reading BUS messages. In another example, the activation alert 24 is recognized by reading signals received through discrete wiring.

The activation alert 24 is next communicated to the computer module 14 at step block 204. In response to receiving the activation alert 24, the computer module 14 initializes a start-up and initialization sequence at step block 206. That is, the computer module 14 awakens from a sleep mode and is prepared to respond to a validated output signal 22 which represents that an input signal 20 received by the sensor 12 is valid. The activation alert 24 is communicated prior to the validated output signal 22.

At step block 208, and in response to receiving a validated output signal 22, the computer module 14 actuates an electronic system 16. For example, the computer module 14 may unlock a vehicle door in response to receiving the validated output signal 22 where the electronic system 16 is part of a PASE system. Alternatively, at step block 210, the computer module 14 may return to a sleep mode in response to receiving an invalid output signal. An invalid output signal represents an input signal 20 which is determined to be invalid, thus indicating that no action need be performed by the computer module 14.

Figure 6:
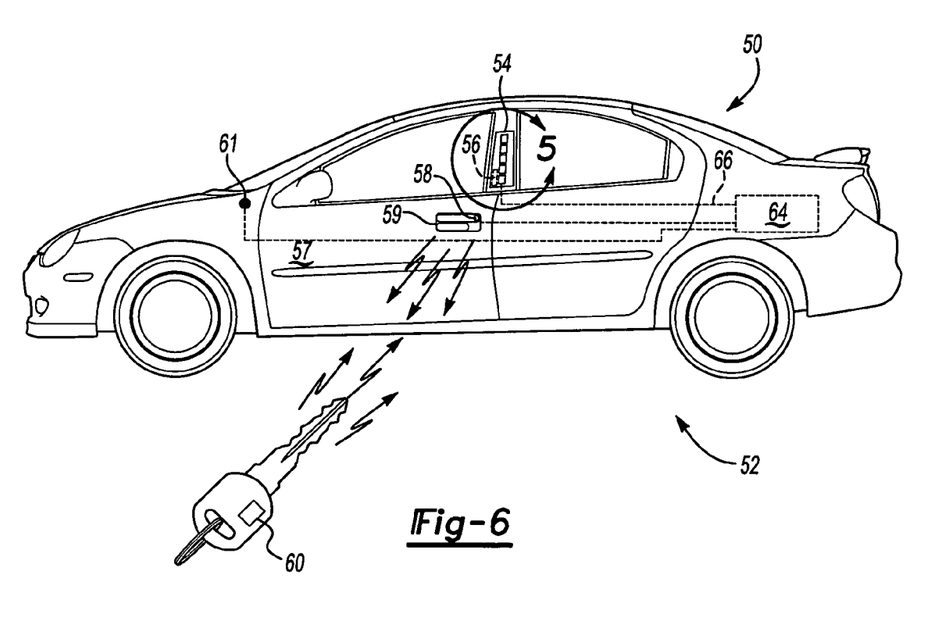
FIG. 6 illustrates an example sensor system for communicating with a vehicle passive entry and starting (PASE) system according to the present invention.

Referring to FIG. 6, a sensor system 50 for a passive entry and starting (PASE) system 52 is illustrated. The sensor system 50 includes a keypad sensor 54 and a computer module 64.

Figure 7:
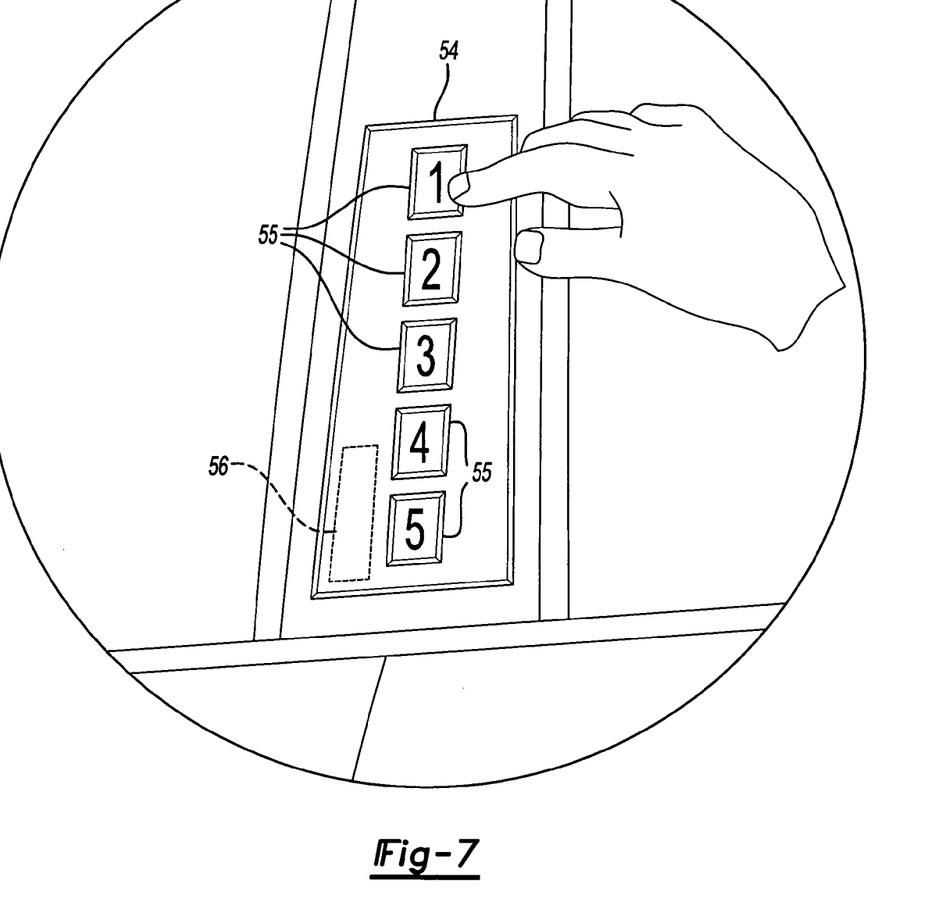
FIG. 7 illustrates an example keypad sensor for the sensor system as illustrated in FIG. 6.

The keypad sensor 54 includes a microprocessor 56. As is known, the microprocessor 56 is programmable to execute a set of instructions. The keypad sensor 54 also includes a plurality of actuable buttons 55 (See FIG. 7) used for entering codes to enable locking and unlocking of a vehicle door 57. The keypad sensor 54 is also utilized to trigger the PASE system 52, as is further discussed below.

In response to receipt of an input signal, such as the actuation of at least one of the plurality of actuable buttons 55 (FIG. 7), the microprocessor 56 analyzes and filters the input signal during the debouncing time of the input signal to determine whether the input signal represents a valid input signal. In one example, the keypad sensor 54 utilizes capacitive sensors to recognize the actuation of one of the plurality of buttons 55. In another example, the output signal is filtered and analyzed during the debouncing time in 5 millisecond intervals to determine the validity of the signal.

Meanwhile, an activation alert 66 is communicated from the keypad sensor 54 to the computer module 64 in response to a predefined prompt. In one example, the activation alert 66 is communicated to the computer module 64 via a BUS message. In another example, the activation alert 66 is communicated to the computer module 64 via discrete wiring which is connected between the computer module 64 and the keypad sensor 54. However, the activation alert 66 may be communicated from the keypad sensor 54 to the computer module 64 in any known manner.

In one example, the activation alert 66 is communicated to the computer module 64 in response to a predefined prompt that includes a specific lapse of time, a confidence level percentage, or any other definable criteria. An example confidence level percentage of 80% will trigger the communication of an activation alert 66 to the computer module 64. The computer module 64 then begins its start up and initialization sequence. Therefore, the evaluation of the input signal by the microprocessor 56 of the keypad sensor 54 and the startup and initialization period of the computer module 64 are provided in parallel with each other, thereby providing improved reaction time of the PASE system 52.

The computer module 64 is programmed to receive and recognize the activation alert 66. The activation alert 66 awakens the computer module 64 from a sleep mode in which all or part of its circuitry is in a low power or off mode and prepares the computer module 64 to respond by actuating the PASE system 52. An antenna 58 is mounted within a door handle 59 of vehicle door 57 and is electrically connected to the computer module 64 in a known manner. In one example, the antenna 58 is a low frequency antenna having a range of approximately three to six feet.

In response to the receipt of a validated output signal that the input signal is valid, the computer module 64 communicates with the antenna 58. The low frequency antenna 58 is commanded to communicate an output signal in the form of radio frequency (RF) signals. Although the present disclosure is described in terms of radio frequency signals, it should be understood that any known communication medium may be utilized according to the present invention. In the event a transmitter 60 is within the range of the antenna 58, the transmitter 60 receives the output signal from the antenna 58 and communicates an input signal to a remote antenna 61 in the form of radio frequency signals. In one example, the remote antenna 61 is a high frequency antenna mounted within the dashboard of the vehicle. In another example, the antenna is mounted internally to the computer module 64. One example transmitter 60 is a smart key.

The remote antenna 61 communicates with the computer module 64 in response to the receipt of an input signal from the transmitter 60. In the event the transmitter 60 is within the desired range of the antenna 58 and the remote antenna 61 such that an authorized user is identified, the computer module 64 actuates the PASE system 52 by unlocking the vehicle door 57, for example.

The foregoing description shall be interpreted as illustrative and not in any limiting sense. A worker of ordinary skill in the art would recognize that certain modifications would come within the scope of this invention. For that reason, the following claims should be studies to determine the true scope and content of this invention.

What is claimed is:

1. A method of preparing a computer module for the receipt of an activation alert communicated from a sensor system, comprising the steps of:
    (a) communicating the activation alert from the sensor system to the computer module, wherein the activation alert is communicated from the sensor system at least partially simultaneously with an evaluation of an input signal by the sensor system to prepare the computer module to respond to a validated output signal; and
    (b) initializing a start-up and initialization sequence of the computer module in response to receiving the activation alert.

2. The method as recited in claim 1, comprising the step of:
    (c) programming the computer module to respond to a validated output signal, wherein the computer module receives the activation alert prior to the validated output signal.

3. The method as recited in claim 2, wherein said step (c) comprises the steps of:
    awakening the computer module from a sleep mode; and
    preparing the computer module to respond to the validated output signal.

4. The method as recited in claim 2, comprising the step of:
    (d) actuating an electronic system in response to receiving the validated output signal.

5. The method as recited in claim 4, wherein the electronic system is part of a Passive Entry and Starting (PASE) System and said step (e) comprises the step of:
    unlocking a vehicle door in response to receiving the validated output signal.

6. The method as recited in claim 1, wherein said step (a) comprises the step of:
    recognizing the activation alert by reading a BUS message.

7. The method as recited in claim 1, wherein said step (a) comprises the step of:
    recognizing the activation alert by reading signals received through discrete wiring.

8. The method as recited in claim 1, comprising the step of:
    (c) returning the computer module to a sleep mode in response to receiving an invalid output signal, wherein the computer module receives the activation alert prior to the invalid output signal.

9. The method as recited in claim 1, wherein the activation alert is a signal communicated to the computer module that a signal change is possible.

10. The method as recited in claim 1, wherein the activation alert is communicated in response to a defined confidence level percentage.

11. A computer module for a sensor system, comprising:
    a microprocessor; and
    input circuitry in communication with said microprocessor, wherein said microprocessor is operable to receive an activation alert through said input circuitry and initialize a start-up and initialization sequence in response to receiving said activation alert, and wherein said activation alert is communicated from said microprocessor at least partially simultaneously with an evaluation of an input signal by said microprocessor to prepare the computer module to respond to a validated output signal.

12. The computer module as recited in claim 11, wherein said input circuitry receives said activation alert through a BUS message.

13. The computer module as recited in claim 11, wherein said input circuitry includes discrete wiring connected between said computer module and the sensor system, wherein said activation alert is received through said discrete wiring.

14. The computer module as recited in claim 13, comprising protective circuitry and switching circuitry connected between the sensor system and said input circuitry.

15. The computer module as recited in claim 11, wherein said activation alert is a signal communicated to said computer module that a signal change is possible.

16. A Passive Entry and Starting (PASE) system for a vehicle, comprising:
    a keypad sensor having a microprocessor and at least one actuable button, wherein said microprocessor is operable to analyze an input signal received in response to a manipulation of said at least one actuable button; and
    a computer module in communication with said microprocessor of said keypad sensor, wherein said computer module is operable to recognize an activation alert communicated from said microprocessor and initialize a start-up and initialization sequence in response to recognition of said activation alert, and wherein said activation alert is communicated from said microprocessor at least partially simultaneously with an evaluation of said input signal by said microprocessor to prepare said computer module to respond to a validated output signal.

17. The system as recited in claim 16, wherein said activation alert is received through BUS messages.

18. The system as recited in claim 16, wherein said activation alert is received through discrete wiring connected between said keypad sensor and said computer module.

* * * * *